(12) United States Patent
Kim

(10) Patent No.: US 11,395,056 B2
(45) Date of Patent: Jul. 19, 2022

(54) ELECTRONIC DEVICE INCLUDING FIXING MEMBER FOR FIXING SPEAKER

(71) Applicant: Samsung Electronics Co., Ltd., Gyeonggi-do (KR)

(72) Inventor: Kwanghyun Kim, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 17/263,966

(22) PCT Filed: Aug. 28, 2019

(86) PCT No.: PCT/KR2019/010990
§ 371 (c)(1),
(2) Date: Jan. 28, 2021

(87) PCT Pub. No.: WO2020/050542
PCT Pub. Date: Mar. 12, 2020

(65) Prior Publication Data
US 2021/0314689 A1    Oct. 7, 2021

(30) Foreign Application Priority Data

Sep. 3, 2018 (KR) .................. 10-2018-0104836

(51) Int. Cl.
*H04R 1/02* (2006.01)
*G06F 1/16* (2006.01)

(52) U.S. Cl.
CPC .......... *H04R 1/028* (2013.01); *G06F 1/1688* (2013.01); *H04R 1/025* (2013.01)

(58) Field of Classification Search
CPC ........ H04R 1/028; H04R 1/025; G06F 1/1688

USPC ......................................... 381/334
See application file for complete search history.

(56) References Cited

U.S. PATENT DOCUMENTS

| | | |
|---|---|---|
| 2009/0021898 A1 | 1/2009 | Konno et al. |
| 2009/0034777 A1 | 2/2009 | Nho et al. |
| 2013/0329934 A1* | 12/2013 | Casebolt ............... G06F 1/1688 381/386 |
| 2015/0201258 A1 | 7/2015 | Han |
| 2016/0088398 A1 | 3/2016 | Kim et al. |
| 2017/0149942 A1 | 5/2017 | Lee et al. |

FOREIGN PATENT DOCUMENTS

| | | |
|---|---|---|
| CN | 103677133 A | 3/2014 |
| JP | S49 29879 U | 3/1974 |
| JP | 2014-154922 A | 8/2014 |
| JP | 2015-186122 A | 10/2015 |

(Continued)

OTHER PUBLICATIONS

European Search Report dated Aug. 17, 2021.

*Primary Examiner* — Sean H Nguyen
(74) *Attorney, Agent, or Firm* — Cha & Reiter, LLC

(57) ABSTRACT

An electronic device according to various embodiments may comprise: a rear case including at least one hole; a front case disposed to face the rear case; a speaker mounted in a space between the rear case and the front case, and outputting a sound signal to the outside; and a fixing member having a part exposed to the outside through the hole of the rear case, and connecting the speaker and the rear case so as to fix the speaker to the rear case. In addition, other embodiments are possible.

13 Claims, 4 Drawing Sheets

(56) References Cited

FOREIGN PATENT DOCUMENTS

| KR | 1999-0001618 U | 1/1999 |
|----|----------------|--------|
| KR | 2000-0004269 A | 1/2000 |
| KR | 10-2009-0013908 A | 2/2009 |
| KR | 10-2015-0084209 A | 7/2015 |
| KR | 10-2017-0059083 A | 5/2017 |

* cited by examiner

ELECTRONIC DEVICE INCLUDING FIXING MEMBER FOR FIXING SPEAKER

CROSS REFERENCE TO RELATED APPLICATIONS

This application is a National Phase Entry of PCT International Application No. PCT/KR2019/010990, which was filed on Aug. 28, 2019, and claims a priority to Korean Patent Application No. 10-2018-0104836, which was filed on Sep. 3, 2018, the contents of which are incorporated herein by reference.

TECHNICAL FIELD

Various embodiments of the disclosure relate to an electronic device including a fixing member for fixing a speaker.

BACKGROUND ART

Personal computer devices that support various functions are provided. These electronic devices are requested to support various functions of a high performance while being miniaturized in terms of design.

For example, there is a need for various speaker designs to improve a sound output performance by mounting a high-end speaker in an electronic device, but not to increase a size and weight of the electronic device.

DISCLOSURE OF INVENTION

Technical Problem

In order to improve a sound output performance, it is necessary to secure an area in which a speaker is disposed, but it is substantially difficult to secure a disposition area of the speaker without reducing a mounting area of other components or increasing a size of the electronic device. Accordingly, it is necessary to secure a disposition area of the speaker without increasing a size of the electronic device through design combination between components that implement other functions unrelated to a sound output in the electronic device.

Various embodiments of the disclosure provide an electronic device capable of fixing a speaker at a designated position inside the electronic device by utilizing a rubber foot configuration disposed at a rear surface of the electronic device so that an outer housing of the electronic device does not directly contact a bottom surface.

Solution to Problem

According to various embodiments of the disclosure, an electronic device includes a rear case including at least one hole; a front case disposed to face the rear case; a speaker mounted in a space between the rear case and the front case and configured to output a sound signal to the outside; and a fixing member having a portion exposed to the outside through the hole of the rear case and configured to connect the speaker and the rear case so that the speaker is fixed to the rear case.

According to various embodiments of the disclosure, an electronic device includes a rear case including at least one hole; a front case disposed to face the rear case; a speaker mounted in a space between the rear case and the front case and configured to output a sound signal to the outside; a speaker screw configured to connect the speaker and the front case; and a fixing member having a portion exposed to the outside through the hole of the rear case, and configured to connect the speaker and the rear case.

Advantageous Effects of Invention

An electronic device according to various embodiments of the disclosure integrates a rubber foot configuration of an electronic device that contacts a bottom surface when a rear surface of the electronic device is placed at the bottom surface, and a speaker rubber configuration that fixes a speaker to a housing, thereby maximizing a mounting area of the speaker in the electronic device. Accordingly, a sound output performance can be improved by securing an internal volume (or space) of the speaker without increasing a size and weight of the electronic device.

Further, because one configuration can replace functions of two or more configurations, it is possible to obtain a cost reduction effect by reducing the number of components.

MODE FOR THE INVENTION

Figure 1:
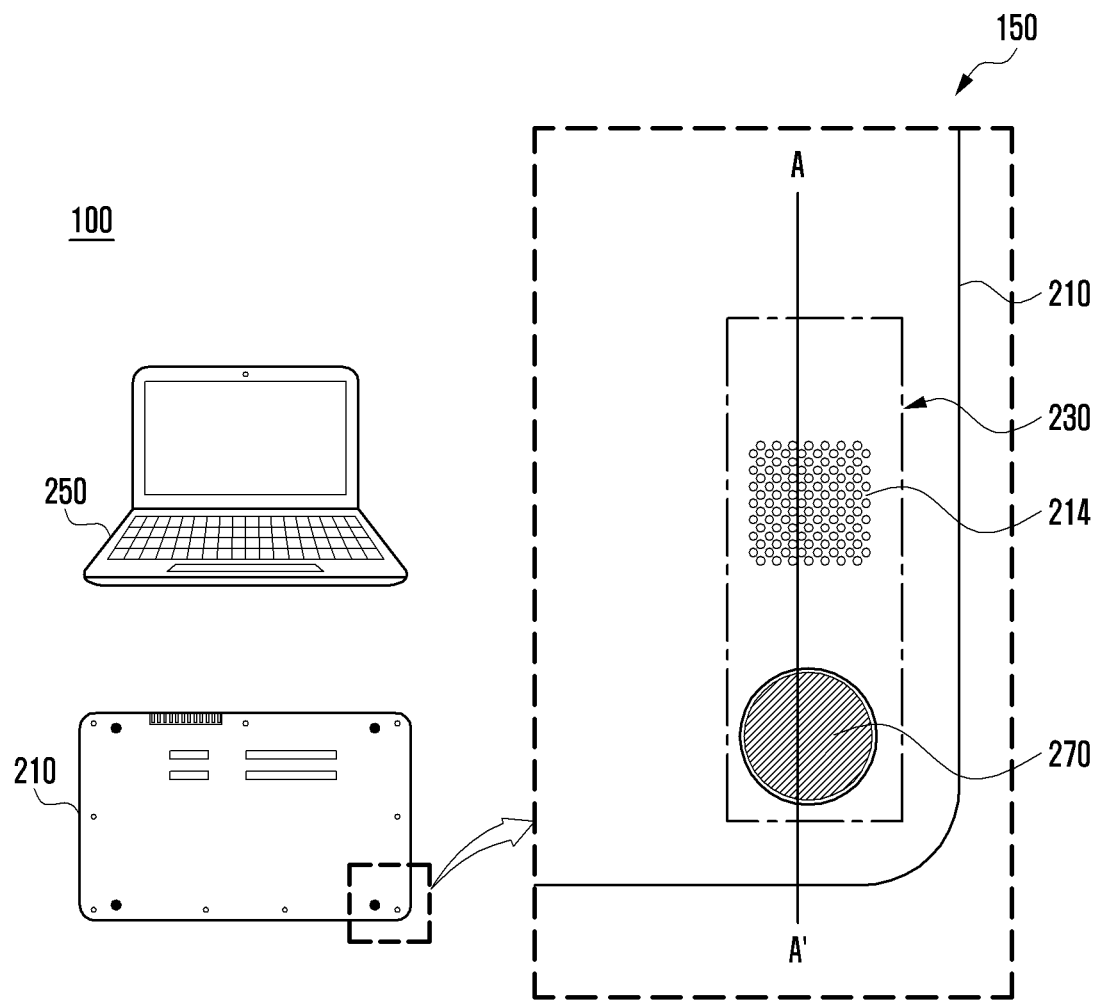
FIG. 1 is a diagram illustrating an appearance of an electronic device 100 according to an embodiment of the disclosure.

Hereinafter, various exemplary embodiments of this document will be described in detail with reference to the accompanying drawings. It should be understood that exemplary embodiments and terms used in the exemplary embodiments do not limit technology described in this document to a specific embodiment and include various changes, equivalents, and/or replacements of a corresponding exemplary embodiment. The same reference numbers are used throughout the drawings to refer to the same or like parts.

In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component (e.g., a first component) is referred to as being "connected" or "accessed" to other component (e.g., a second component), it should be understood that not only the component is directly connected or accessed to the other component, but also there may exist another component (e.g., a third component) between them. Meanwhile, in the case where a component is referred to as being "directly connected" or "directly accessed" to other component, it should be understood that there is no component therebetween. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

In this document, "configured to (or set to)" may be interchangeably used in hardware and software with, for example, "appropriate to", "having a capability to", "changed to", "made to", "capable of", or "designed to" according to a situation. In any situation, an expression "device configured to" may mean that the device is "capable of" being configured together with another device or component. For example, a phrase "processor configured to (or set to) perform A, B, and C" may mean an exclusive processor (e.g., an embedded processor) for performing a corresponding operation or a generic-purpose processor (e.g., CPU or application processor) that can perform a corresponding operation by executing at least one software program stored at a memory device.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

An electronic device according to various exemplary embodiments of this document may include at least one of, for example, a smart phone, tablet personal computer (PC), mobile phone, video phone, electronic book reader, desktop PC, laptop PC, netbook computer, workstation, server, personal digital assistant (PDA), portable multimedia player (PMP), MP3 player, medical device, camera, and wearable device. The wearable device may include at least one of an accessory type device (e.g., watch, ring, bracelet, ankle bracelet, necklace, glasses, contact lens), head-mounted-device (HMD), textile or clothing integral type device (e.g., electronic clothing), body attachment type device (e.g., skin pad or tattoo), and bio implantable circuit In an exemplary embodiment, the electronic device may include at least one of, for example, a television, Digital Video Disk (DVD) player, audio device, refrigerator, air-conditioner, cleaner, oven, microwave oven, washing machine, air cleaner, set-top box, home automation control panel, security control panel, media box (e.g., Samsung HomeSync™, AppleTV™, or Google TV™), game console (e.g., Xbox™, PlayStation™), electronic dictionary, electronic key, camcorder, and electronic frame.

In another exemplary embodiment, the electronic device may include at least one of a navigation device, global navigation satellite system (GNSS), event data recorder (EDR), flight data recorder (FDR), vehicle infotainment device, ship electronic equipment (e.g., ship navigation device, gyro compass), avionics, security device, vehicle head unit, industrial or home robot, drone, automatic teller machine (ATM) of a financial institution, point of sales (POS) of store, and Internet of things (e.g., bulb, various sensors, sprinkler, fire alarm, thermostat, street light, toaster, exercise device, hot water tank, heater, boiler).

In various exemplary embodiments, the electronic device may be flexible or may be two or more combinations of the foregoing various devices. An electronic device according to an exemplary embodiment of this document is not limited to the foregoing devices. In this document, a term "user" may indicate a person using an electronic device or a device (e.g., artificial intelligence electronic device) using an electronic device.

FIG. 1 is a diagram illustrating an appearance of an electronic device 100 according to various embodiments of the disclosure.

With reference to FIG. 1, an electronic device 100 according to an embodiment may include a display unit and a main body. For example, the main body of the electronic device 100 may be formed in a structure in which electronic components are mounted inside a housing enclosed by a front case 250 and a rear case 210 disposed to face the front case 250. For example, in a partial area of the front case 250 of the main body, a component capable of inputting a user input to the electronic device 100, such as a keyboard, may be disposed, but according to another embodiment, in the electronic device 100, the display unit and the main body are integrally configured; thus, the display unit may be disposed on the front case of the main body instead of including a separate display unit.

Hereinafter, one side portion 150 of the electronic device 100 of FIG. 1 will be described with reference to an enlarged view. For example, a plurality of speakers 230, fixing members 270, and speaker grill portions 214 of the electronic device 100 to be described later may be disposed at various locations, respectively of the electronic device 100.

According to various embodiments, at least one fixing member 270 may be disposed at a rear surface of the electronic device 100, which is a direction in which the rear case 210 faces. For example, the rear case 210 may include at least one hole, and the fixing member 270 may be partially exposed to the outside through the at least one hole and be disposed to shield the at least one hole. For example, a portion of the fixing member 270 exposed to the outside may be configured in various shapes such as a circle, an ellipse, and a polygon, and is not limited to a circular shape illustrated in FIG. 1.

The fixing member 270 according to various embodiments may be made of a rubber material.

For example, when the electronic device 100 is placed at the bottom so that the rear surface of the electronic device 100 faces an external bottom surface, the fixing member 270 may contact an external bottom surface through the portion exposed to the outside. When the electronic device 100 is placed at the external bottom surface, the fixing member 270 instead of the rear case 210 contacts the external bottom surface; thus, the fixing member 270 contacts the external bottom surface with a greater friction than when the rear case 210 contacts the external bottom surface, thereby minimizing shaking or slipping of the electronic device 100. Further, because the rear case 210 does not directly contact the bottom surface, damage of a surface of the rear case 210 may be prevented and an internal heat generated when the electronic device 100 is driven through a space spaced from the bottom surface may be easily emitted or unnecessary noise may be prevented from occurring.

According to various embodiments, the electronic device 100 may include a speaker 230 inside the housing of the main body. For example, the speaker 230 may output a sound signal to the outside under the control of a processor of the electronic device 100.

In order to smoothly output the sound signal from the speaker 230 to the outside, the rear case 210 may further include a speaker grill portion 214 formed with a plurality of holes. For example, the speaker grill portion 214 may be integrally formed with the rear case 210.

According to various embodiments of the disclosure, the fixing member 270 may be disposed so that the fixing member 270 passes through each of a speaker hole of the speaker 230 and a hole of the rear case 210, and at least a portion thereof is exposed to the outside. The fixing member 270 may physically connect the rear case 210 and the speaker 230 of the electronic device 100 to fix the speaker 230 so that the speaker 230 may be disposed at a designated position of the rear case 210.

Figure 2:
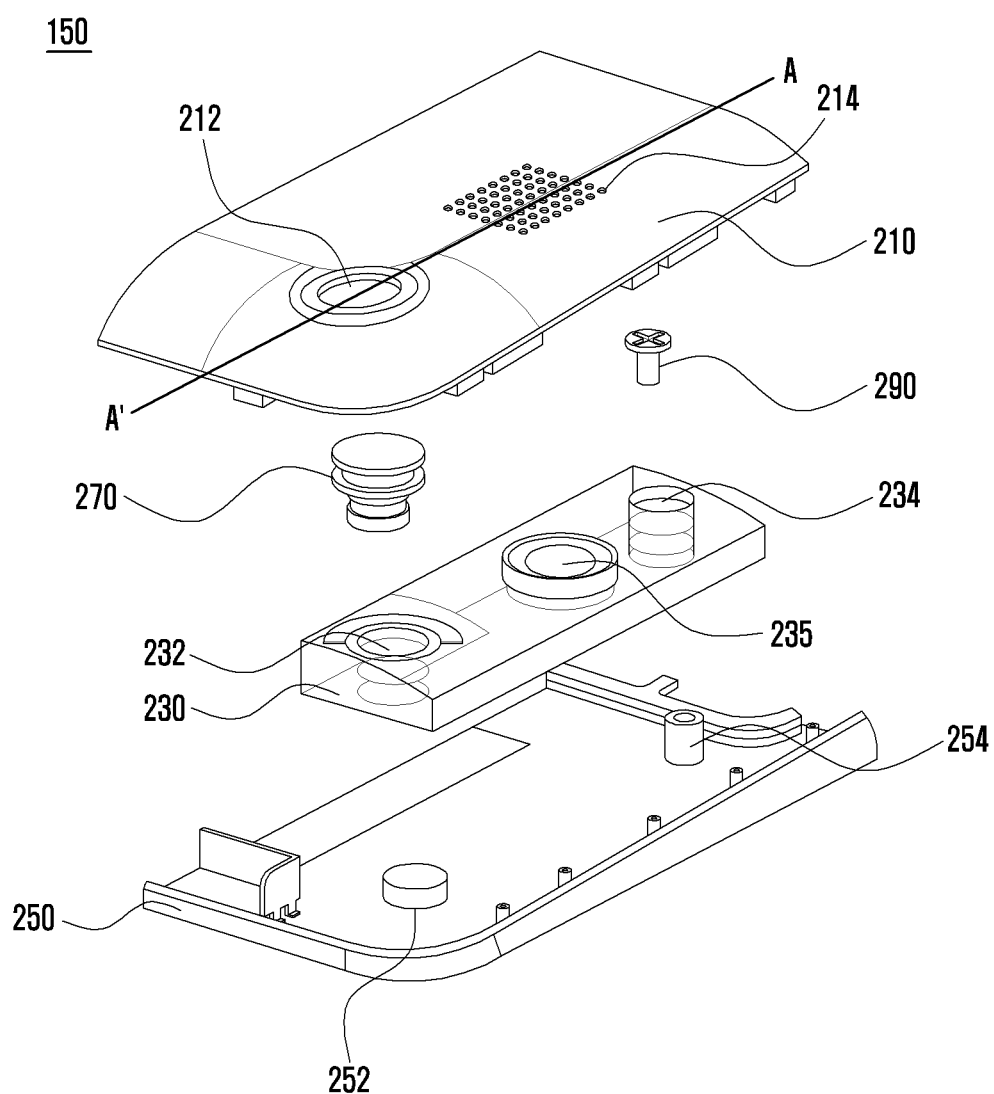
FIG. 2 is an exploded perspective view illustrating an internal structure of a side portion 150 of an electronic device 100 according to an embodiment of the disclosure.
Figure 3:
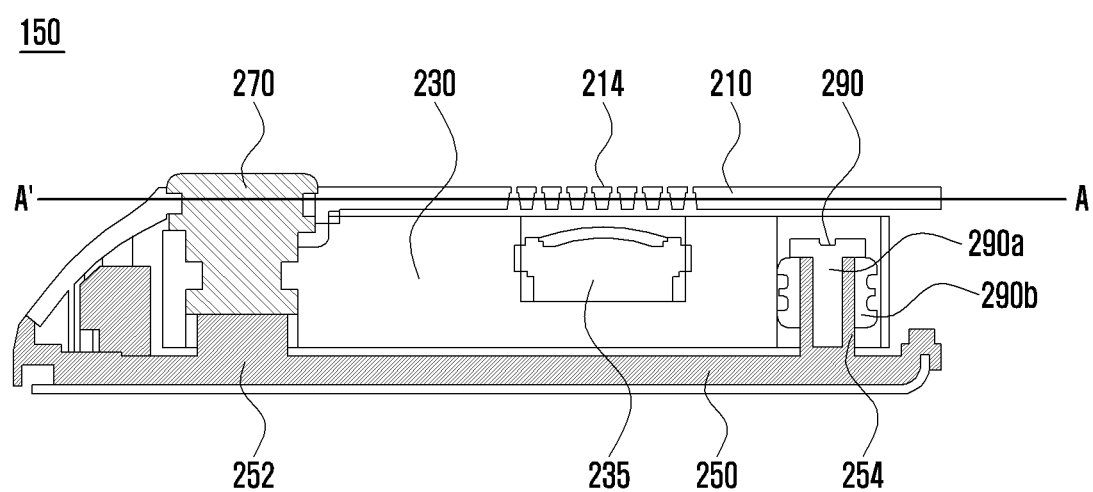
FIG. 3 is a side cross-sectional view illustrating a side portion 150 of the electronic device 100 taken along a plane A-A' of FIG. 1.

FIG. 2 is an exploded perspective view illustrating an internal structure of a side portion 150 of the electronic device 100 according to an embodiment of the disclosure, and FIG. 3 is a side cross-sectional view illustrating a side portion 150 of the electronic device 100 taken along a plane A-A' of FIG. 1.

With reference to FIGS. 2 and 3, an electronic device 100 according to various embodiments of the disclosure may include a rear case 210 and a front case 250 disposed to face the rear case 210, and mount an electronic component (e.g., a speaker 230) between the rear case 210 and the front case 250.

The rear case 210 may include at least one hole 212 for penetrating the fixing member 270, and a speaker grill portion 214 serving as an outlet for a sound signal output from the speaker 230.

The speaker 230 is an electronic component for outputting a sound signal to the outside, and may be configured with, for example, a speaker component 235 of at least one of a vibration plate, a coil, a magnetic body, and a vibration motor, and a space for resonance. For example, the speaker 230 may generate a sound signal through resonance of the vibration plate, and in this case, the wider the resonance space inside the speaker 230 in which the sound signal may be resonated is designed, the more advantageous a sound output performance of the speaker 230 may be.

The speaker grill portion 214 of the rear case 210 may be formed in an area corresponding to a disposition position of the speaker components 235.

According to various embodiments, the speaker 230 may include a first speaker hole 232 for penetrating the fixing member 270. The fixing member 270 may connect the rear case 210 and the speaker while penetrating the hole 212 of the rear case 210 and the first speaker hole 232 of the speaker 230.

The fixing member 270 according to various embodiments may have a cylindrical structure including a plurality of grooves. According to another embodiment, the fixing member 270 may have an elliptical column shape or a polygonal (e.g., square) column shape in addition to the cylindrical structure.

The fixing member 270 may include a first groove of a size corresponding to the hole 212 of the rear case 210 in order to fix the speaker 230 to an area of the rear case 210 while passing through each of the rear case 210 and the speaker and a second groove having a size corresponding to a first speaker hole 232 of the speaker 230. For example, the rear case 210 may be coupled to the first groove, and the speaker 230 may be coupled to the second groove.

In order to fix the speaker 230 to an area of the front case 250, the electronic device 100 may further include a speaker screw 290 for connecting the speaker 230 and the front case 250.

For example, the speaker 230 may further include a second speaker hole 234 for penetrating the speaker screw 290. The speaker screw 290 may include speaker rubbers 290a and 290b, for example, may be configured with a structure corresponding to a coupling structure 254 protruded from the front case 250 and a structure (not illustrated) provided inside the second speaker hole 234 of the speaker 230 to fix the speaker 230 to the front case 250.

Unlike the fixing member 270, the speaker screw 290 may not be exposed to the outside. For example, the fixing member 270 may be disposed in an area corresponding to the hole of the rear case 210 to connect the rear case 210 and the speaker 230, but the speaker screw 290 may connect the speaker 230 and the front case 250 in an area inside the rear case 210 that is not visible from the outside.

In order to support the fixing member 270 protruded in a direction of the front case 250 by passing through the speaker 230, the front case 250 may further include a support member 252 protruded in an inner direction of the electronic device 100 at a position corresponding to the fixing member 270. The fixing member 270 according to various embodiments is made of a rubber material, and when the fixing member 270 is pressed by an external object, the fixing member 270 may be supported by the support member 252 and absorb some external impact.

According to an embodiment, the support member 252 may further include a rib structure (not illustrated) at a side portion (e.g., a side portion of a cylindrical surface of the support member 252) in order to effectively absorb an impact from the outside.

According to an embodiment, the support member 252 has a detachable separate structure and may have a structure coupled to one surface of the front case 250. According to another embodiment, the support member 252 may not be configured as a separate component and may be integrally formed at an inner surface of the front case 250. For example, the support member 252 may be implemented in various shapes, such as a polygonal column structure, and a structure formed in only a rib structure without including a column in the center, in addition to the cylindrical structure illustrated in FIG. 2. The electronic device 100 according to various embodiments may include a fastening structure in which the rear case 210 and the front case 250 are mechanically coupled to each other. For example, as illustrated in FIGS. 2 and 3, each mechanical fastening structure is formed in an outer periphery of the rear case 210 and the front case 250; thus, the rear case 210 and the front case 250 may be coupled to each other through the fastening structure.

The electronic device 100 according to various embodiments of the disclosure may serve to protect the rear case 210 through a portion of the fixing member 270 exposed to the outside while connecting the rear case 210 and the speaker 230 through the fixing member 270. Because the fixing member 270 includes a plurality of grooves to fix the rear case 210 and the speaker 230 at a designated position, the fixing member may fix the rear case 210, the speaker 230, and the front case 250 while minimizing the number of the speaker screw 290 penetrating the speaker 230 of the electronic device 100. Accordingly, because the speaker 230 of the electronic device 100 can design an internal resonance space as wide as possible, the maximum performance of the speaker 230 can be implemented in a limited space.

According to various embodiments, the electronic device 100 may mount a plurality of speakers 230 therein. In this case, a plurality of fixing members 270 may be provided to correspond to the plurality of speakers 230, and each of the fixing members 270 may pass through any one of a plurality of holes of the rear case 210 to fix each of the speakers 230 to the rear case 210.

Figure 4:
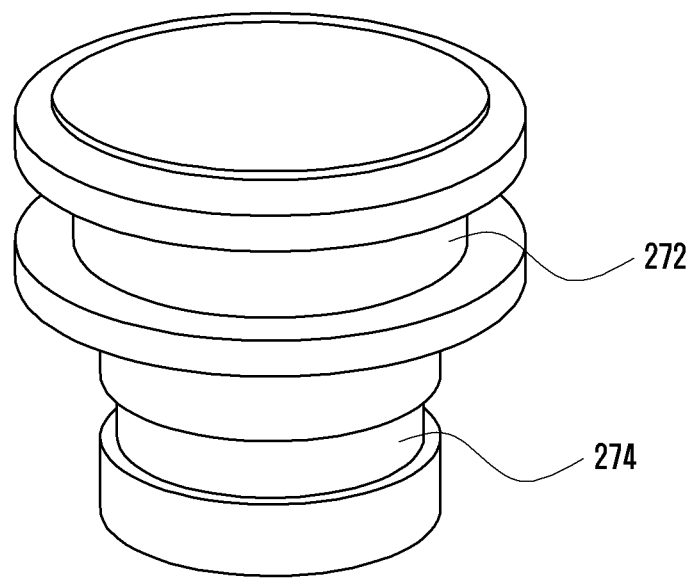
FIG. 4 is a diagram illustrating a fixing member 270 according to an embodiment of the disclosure.

FIG. 4 is a diagram illustrating a fixing member 270 according to an embodiment of the disclosure.

With reference to FIG. 4, the fixing member 270 may include a first groove 272 formed in a size corresponding to a hole of the rear case 210 to insert and couple the rear case 210 and a second groove 274 formed in a size corresponding to a first speaker hole of the speaker 230 to insert and couple the speaker 230.

In the fixing member 270 according to an embodiment, an outer diameter of the first groove 272 may be larger than that of the second groove 274. For example, by forming an outer diameter of the first groove 272 to be larger than that of the second groove 274, the electronic device 100 may secure a resonance space of the speaker 230 as wide as possible, while by increasing an area of the fixing member 270 exposed to the outside through the hole of the rear case 210, the electronic device 100 may increase a contact area with an outer bottom surface of the fixing member 270.

The fixing member 270 according to various embodiments may be configured in a substantially cylindrical shape, as illustrated in FIG. 4, but may be configured in various shapes such as an elliptical column shape or a polygonal column shape, and in this case, it may be understood that outer diameters of the first groove portion 272 and the second groove portion 274 are cross-sectional areas of the first groove portion 272 and the second groove portion 274, respectively.

An electronic device according to various embodiments of the disclosure may include a rear case including at least one hole; a front case disposed to face the rear case; a speaker mounted in a space between the rear case and the front case and configured to output a sound signal to the outside; and a fixing member having a portion exposed to the outside through the hole of the rear case and configured to connect the speaker and the rear case so that the speaker is fixed to the rear case.

According to various embodiments, the electronic device may further include a speaker screw configured to connect the speaker and the front case so that the speaker is fixed to the front case.

According to various embodiments, the speaker may include a speaker hole, and the fixing member may penetrate the speaker hole to connect the speaker and the rear case.

For example, the fixing member may include a first groove formed in a size corresponding to the hole of the rear case and to which the rear case is inserted and coupled.

For example, the fixing member may further include a second groove formed in a size corresponding to the speaker hole of the speaker and to which the speaker is inserted and coupled.

For example, an outer diameter (or area) of the first groove may be larger than an outer diameter (or area) of the second groove.

According to various embodiments, the front case may further include a support member protruded in a direction toward the speaker at a position corresponding to the fixing member in order to support the fixing member.

According to various embodiments, the fixing member may be made of a rubber material.

According to various embodiments, the rear case may further include a speaker grill portion in an area corresponding to the speaker.

According to various embodiments, the speaker screw may be disposed on an area different from that of the fixing member, and be shielded from the outside by the rear case.

According to various embodiments, the fixing member may be configured to contact an outer bottom surface in which the electronic device is placed through the portion exposed to the outside.

An electronic device according to various embodiments of the disclosure may include a rear case including at least one hole; a front case disposed to face the rear case; a speaker mounted in a space between the rear case and the front case and configured to output a sound signal to the outside; a speaker screw configured to connect the speaker and the front case; and a fixing member having a portion exposed to the outside through the hole of the rear case, and configured to connect the speaker and the rear case.

According to various embodiments, the speaker may include a first speaker hole and a second speaker hole, the fixing member may pass through the first speaker hole to connect the speaker and the rear case, and the speaker screw may pass through the second speaker hole to connect the speaker and the front case.

According to various embodiments, the fixing member may further include a first groove and a second groove, the first groove may be coupled to an area corresponding to the hole of the rear case, and the second groove may be coupled to an area corresponding to a first speaker hole of the speaker.

According to various embodiments, the fixing member may be configured to contact an outer bottom surface in which the electronic device is placed through the portion exposed to the outside.

According to various embodiments, the front case may include a support member protruded in a direction toward the speaker in an area corresponding to the fixing member in order to support the fixing member.

According to various embodiments, an outer diameter of the first groove may be larger than that of the second groove.

According to various embodiments, each of the rear case and the front case may include a fastening structure that can be mechanically coupled to each other.

According to various embodiments, the rear case may include a speaker grill portion in an area corresponding to the speaker.

According to various embodiments, the fixing member may be made of a rubber material.

The term "module" used in the disclosure may mean, for example, a unit including one of hardware, software, or firmware or a combination of two or more of hardware, software, or firmware. The "module" may be used interchangeably with terms, for example, a unit, logic, logical block, component, or circuit. The "module" may be a smallest unit or part of an integrally configured component. The "module" may be a smallest unit or a part that performs one or more functions. The "module" may be implemented mechanically or electronically. For example, the "module" may include at least one of an application-specific integrated circuit (ASIC) chip, field-programmable gate arrays (FPGAs), or a programmable-logic device, known or to be developed in the future, that perform any operations.

At least a part of a device (e.g., modules or functions thereof) or a method (e.g., operations) according to various embodiments may be implemented into, for example, instructions stored in a computer-readable storage media in the form of a program module. When the instruction is executed by a processor, the one or more processors may perform a function corresponding to the instruction. The computer-readable storage media may be, for example, a memory.

The computer-readable storage media may include a hard disk, floppy disk, magnetic media (e.g., magnetic tape), optical media (e.g., compact disc read only memory (CD-ROM)), digital versatile disc (DVD), magneto-optical media (e.g. floptical disk), and a hardware device (e.g., read only memory (ROM), random access memory (RAM)), or flash memory). Further, the program command may include not only a machine language code generated by a compiler, but also a high-level language code that can be executed by a computer using an interpreter. The above-described hardware device may be configured to operate as one or more software modules to perform the operations of various embodiments, and vice versa.

A module or a program module according to various embodiments may include at least one of the aforementioned constituent elements, may omit some thereof, or may further include other additional constituent elements. Operations performed by a module, a program module, or other components according to various embodiments may be executed sequentially, in parallel, repeatedly, or in a heuristic manner. Further, some operations may be executed in a different order, omitted, or add other operations.

The embodiments disclosed in the disclosure are presented for description and understanding of the disclosed technical contents, and do not limit the scope of the disclosure. Therefore, the scope of the disclosure should be construed as including all changes or various other embodiments based on the technical idea of the disclosure.

The invention claimed is:

1. An electronic device, comprising:
a rear case including at least one hole;
a front case disposed facing the rear case;
a speaker mounted in a space defined between the rear case and the front case, and configured to output a sound signal to an external environment; and
a fixing member including a portion exposed to the external environment through the hole of the rear case, and configured to connect the speaker and the rear case so that the speaker is fixed to the rear case,
wherein the fixing member is configured to contact a surface on which the electronic device is disposed, through the portion of the fixing member that is exposed to the external environment.

2. The electronic device of claim 1, further comprising a speaker screw configured to connect the speaker and the front case so as to fix the speaker to the front case.

3. The electronic device of claim 2, wherein the speaker screw is disposed on an area different from that of the fixing member and is shielded from the external environment by the rear case.

4. The electronic device of claim 2, wherein the speaker further includes a first speaker hole and a second speaker hole,
wherein the fixing member passes through the first speaker hole to connect the speaker and the rear case, and
wherein the speaker screw passes through the second speaker hole to connect the speaker and the front case.

5. The electronic device of claim 2, wherein each of the rear case and the front case includes a fastening structure, and
wherein the fastening structure of the rear case is mechanically coupled to the fastening structure of the front case.

6. The electronic device of claim 1, wherein the speaker further includes a speaker hole, and
wherein the fixing member penetrates the speaker hole to connect the speaker and the rear case.

7. The electronic device of claim 6, wherein the fixing member further includes a first groove formed in a size corresponding to the hole of the rear case, and into which the rear case is inserted and coupled.

8. The electronic device of claim 7, wherein the fixing member further includes a second groove formed in a size corresponding to the speaker hole of the speaker, and into which the speaker is inserted and coupled.

9. The electronic device of claim 8, wherein an outer diameter of the first groove is larger than an outer diameter of the second groove.

10. The electronic device of claim 1, wherein the front case further includes a support member protruding towards the speaker at a position corresponding to the fixing member, in order to support the fixing member.

11. The electronic device of claim 1, wherein the fixing member is formed of a rubber material.

12. The electronic device of claim 1, wherein the rear case further includes a speaker grill portion in an area corresponding to the speaker.

13. The electronic device of claim 1, wherein the front case further includes a support member protruding towards the speaker in an area corresponding to the fixing member, in order to support the fixing member, and
wherein the rear case further includes a speaker grill portion in an area corresponding to the speaker.

* * * * *